Oct. 25, 1949.        O. W. OERMAN        2,485,651
IMPLEMENT ADJUSTING CONNECTION

Filed May 11, 1944        3 Sheets-Sheet 1

INVENTOR.
OREY W. OERMAN
ATTORNEYS

INVENTOR
OREY W. OERMAN
BY
ATTORNEYS

Oct. 25, 1949. O. W. OERMAN 2,485,651
IMPLEMENT ADJUSTING CONNECTION
Filed May 11, 1944 3 Sheets-Sheet 3

INVENTOR.
OREY W. OERMAN
BY
ATTORNEYS

Patented Oct. 25, 1949

2,485,651

UNITED STATES PATENT OFFICE 2,485,651

IMPLEMENT ADJUSTING CONNECTION

Orey W. Oerman, Moline, Ill., assignor to Deere & Company, Moline, Ill., a corporation of Illinois Application May 11, 1944, Serial No. 535,121

2 Claims. (Cl. 97—98)

1

The present invention relates generally to agricultural implements and more particularly to tractor carried implements of the type known as integral equipment.

The object and general nature of the present invention is the provision of new and improved lifting and adjusting connections for an integral implement such as a tractor carried plow. More particularly, it is an important feature of this invention to provide new and improved lifting and adjusting connections arranged so that, during the adjusting range, the front end of the plow is raised or lowered relative to the tractor, which movement is also accompanied by a corresponding movement of a gauge wheel carried at the rear of the plow and which is interconnected with the adjusting means so that it also is adjusted when the front end of the hitch is raised and lowered. Further, it is a feature of this invention to provide adjusting and lifting connections arranged so that when the implement is raised into its transport position the front or hitch connection is also raised but the gauge wheel is not moved to any great extent relative to the plow.

These and other objects and advantages of the present invention will be apparent to those skilled in the art after a consideration of the following detailed description, taken in conjunction with the accompanying drawings in which the preferred form of the present invention has been illustrated.

In the drawings:

Figure 1a is a fragmentary side view of the depth control linkage, the same being shown from the other side of the tractor.

Figure 1:
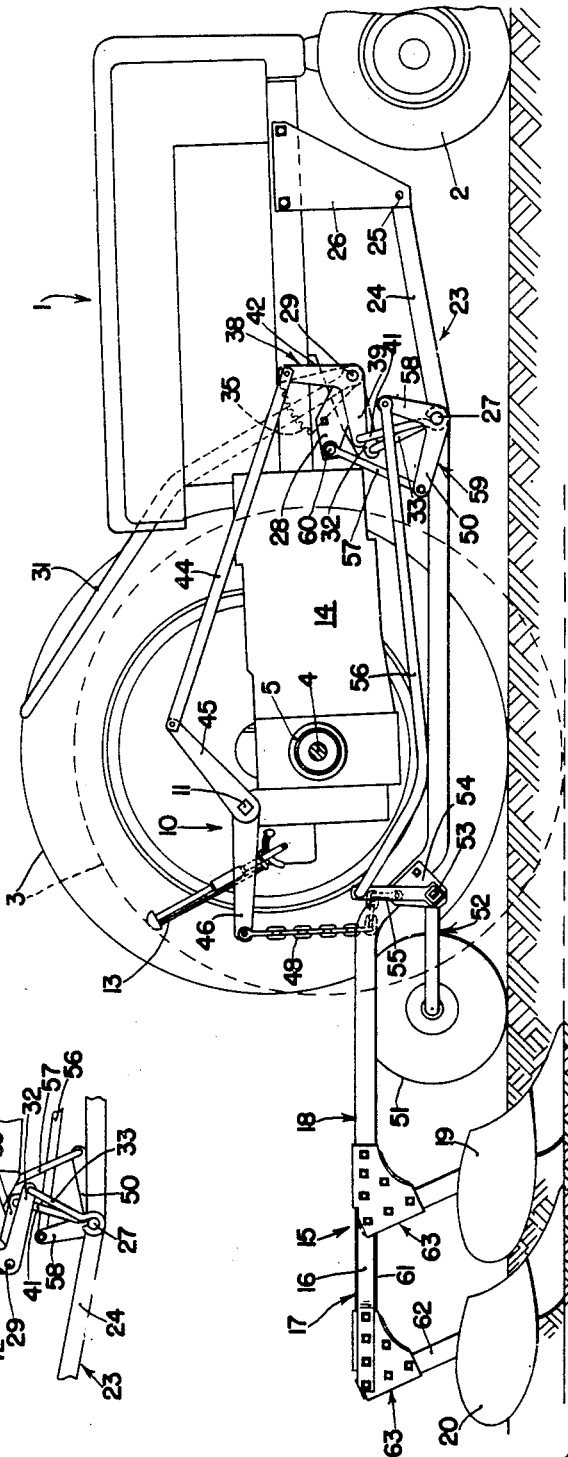
Figure 1 is a side view of a tractor plow incorporating the principles of the present invention, the same being shown in a relatively deep plowing position.

Referring now more particularly to Figure 1, the tractor, which forms a supporting means for the implement or tool unit, is indicated in its entirety by the reference numeral 1 and includes a pair of relatively closely spaced front wheels

2

2 and a pair of relatively widely spaced rear heels 3. The rear traction wheels 3 are mounted on axle shafts 4 that are carried in a rear axle structure 5 forming a part of the tractor, preferably a part of the frame of the tractor. Normally, one of the rear wheels 3 runs in the last previously opened furrow while the other runs on the unplowed land. The tractor 1 is equipped with a hydraulic power lift mechanism, indicated in its entirety by the reference numeral 10, and since such mechanism does not per se form a part of the present invention, the same has not been illustrated in detail. Briefly, the lift mechanism 10 includes a transverse rockshaft or power lift shaft 11 which is operated by a piston and cylinder or ram unit through two ranges, one a control or depth adjusting range and the other a lifting range, and the power lift mechanism includes a controlling valve lever 13. A power lift and control mechanism of this type is shown in the co-pending application, Serial No. 434,256, filed March 11, 1942, by Frank T. Court, now U. S. Patent No. 2,423,485, issued July 8, 1947, to which reference may be made if necessary. Fluid for operating the hydraulic mechanism just described may be derived from any suitable source, such as a pump or the like driven by the power plant 14 of the tractor.

The implement proper is indicated in its entirety by the reference numeral 15 and comprises a pair of rigidly interconnected plow beams 17 and 18 carrying plow bottoms 19 and 20 at their rear ends. Each of the plow beams 17 and 18 includes a beam section 61 and a shank section 62, connected together by an improved bracket construction 63 which is disclosed and claimed in applicant's divisional application, Serial No. 619,552, filed October 1, 1945. The plow beams 17 and 18 are connected at their forward ends to a hitch structure 23 which comprises a pair of links 24 pivoted, as at 25, to a pair of brackets 26 bolted to the front end of the tractor. The rear ends of the hitch links 24 are connected to a transverse hitch bar 27 which serves as a brace between the front ends of the plow beams 17 and 18.

A pair of brackets 28 are bolted to opposite sides of the tractor and serve as supports for a rockshaft 29. A leveling lever 31 is mounted for rocking movement on the left end of the rockshaft 29 and, as best shown in Fig. 1a, includes or is provided with an arm 32 that is connected by a link 33 with the left end of the hitch bar 27. A sector 35 is fixed to the left end of the rockshaft 29. Secured to the right end of the rockshaft 29 is a bell crank 38. One arm 39 of the bell crank is connected by a link 41 with the right end of the transverse hitch bar 27. The other arm 42 of the bell crank 38 is connected through a generally longitudinally extending link 44 with an arm 45 that is fixed to the right end of the power lift rockshaft 11. Another arm 46 is fixed to the power lift rockshaft 11 and is connected through a loose chain 48 with the plow beams 17 and 18.

A gauge wheel 51 is disposed in a lateral position between the longitudinal planes of the plow bottoms 19 and 20 and is mounted on a swinging crank axle 52, one portion 53 of which is journaled for rocking movement in a bracket 54 carried by the right hand plow beam 18. An upwardly extending arm 55 is fixed at its lower end to the crank axle portion 53 and is connected through a longitudinally extending link 56 with one arm 58 of a bell crank 59, the other arm 50 of which is connected through a pivoted anchoring link 57 to a fixed point 60 on the tractor.

The operation of the preferred form of the present invention is as follows.

Figure 2:
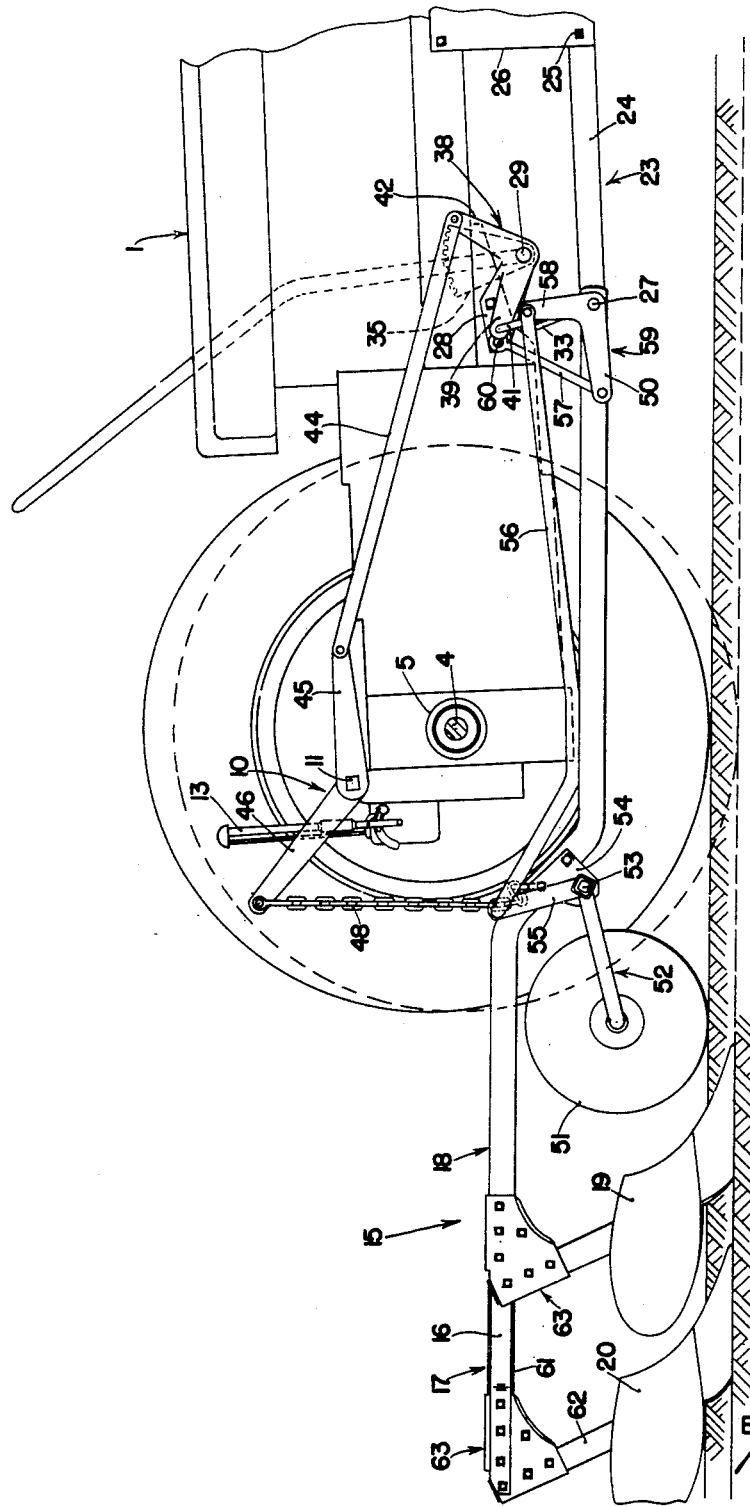
Figure 2 is a view similar to Figure 1 but showing the plow in a relatively shallow plowing position.

Figure 1 shows a plow in a deep plowing position, the valve lever 13 being moved to a rear position so as to cause the power lift rockshaft 11 to swing in a counterclockwise direction into the position shown. This counterclockwise swinging movement of the power lift rockshaft 11 acts through the link 44 to swing the bell crank 38 also in a counterclockwise direction, thus lowering the hitch point 27 and, at the same time, this lowering of the point 27 acts to swing the bell crank 59 in a clockwise direction, since the arm 50 is anchored through the link 57 to the tractor. If it should be desired, for example, to reduce the depth of plowing, the valve lever 13 is manipulated into a shallow plowing position, such as is shown in Figure 2, and as a result the power lift unit is actuated and the power lift rockshaft 11 swung in a clockwise direction into some such position as is shown in Figure 2. This clockwise movement of the power lift rockshaft 11 acts to swing the arm 45 forwardly, thus shifting the link 44 forwardly and swinging the bell crank 38 and the rockshaft 29 in a clockwise direction. The resulting upward movement of the arms 32 and 39 acts through the links 33 and 41 to raise the hitch bar 27. This results in a counterclockwise swinging movement of the bell crank 59, since the arm 50 is prevented from swinging upwardly by the anchoring link 57. The counterclockwise movement of the bell crank 59 acts to force the link 56 rearwardly and thus causes the gauge wheel 51 to be forced downwardly, relative to the plow. Thus, when changing the depth of operation of the plow, both ends of the plow beams are raised, or lowered, so that the plow is always maintained level and the angle of suck kept uniform, both for deep plowing (Figure 1) and for shallow plowing (Figure 2).

Figure 3:
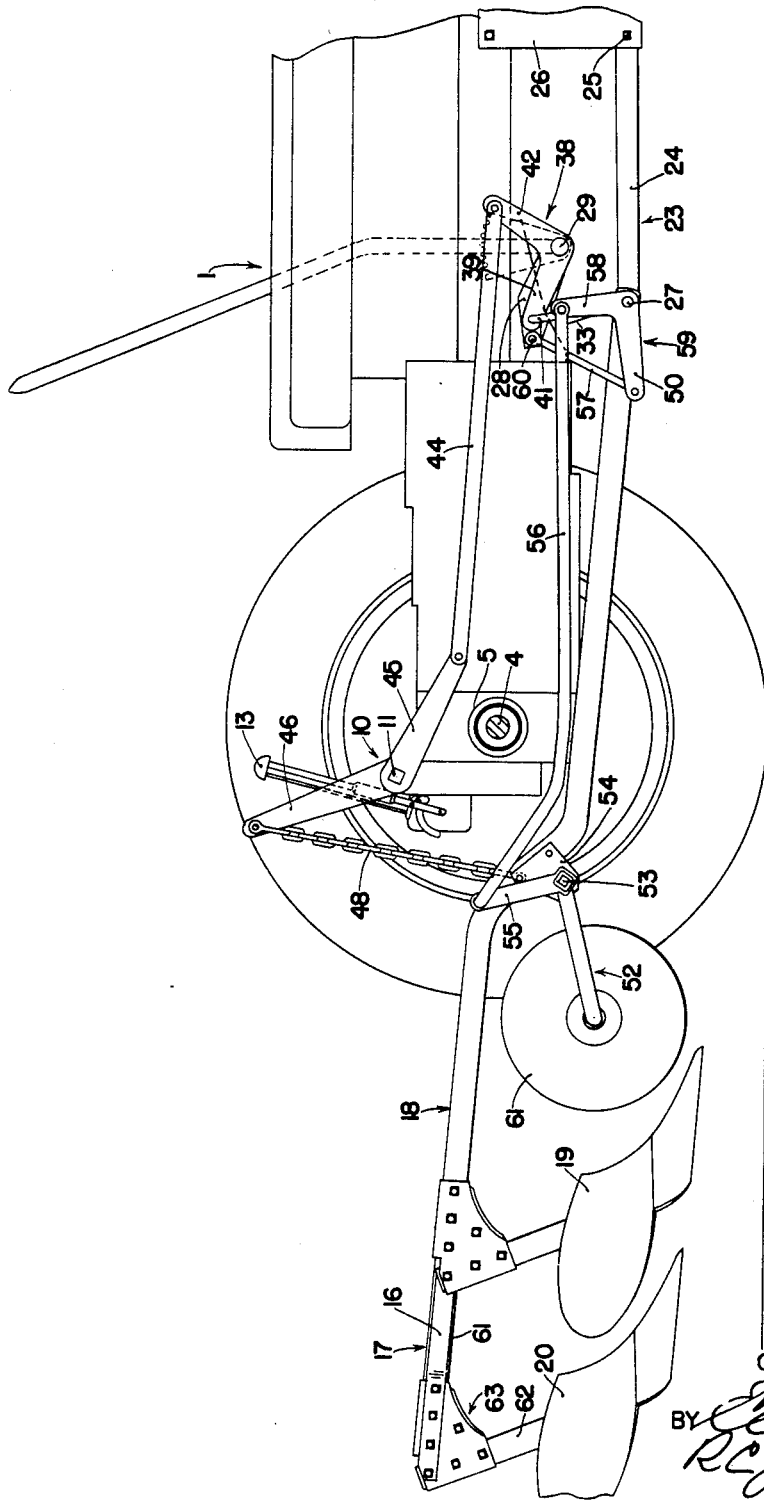
Figure 3 is a view showing the plow in its transport or raised position.

The chain 48 has sufficient excess length so that it remains slack during all movements of the arms 45 and 46 during the depth adjusting range, and the slack in the chain 48 is also sufficient to accommodate relatively free vertical swinging movement of the plow relative to the tractor so that passage of the outfit over uneven terrain is accommodated and does not result in any variation in the depth of plowing. The plow may be raised into its transport position, however, by swinging the valve lever 13 forwardly, which causes the power lift rockshaft 11 to swing in a clockwise direction (Figure 3), thus raising the arm 46, tightening the chain 48 and eventually lifting the rear end of the plow through the chain 48. It will be observed, particularly from Figures 2 and 3, that during the movement of the power lift shaft 11 into its transport position, the arm 45 moves into and through a straight line or dead-center relation with respect to the link 44. This results in only slight movement of the bell crank 38 and thus the position of the gauge wheel 51 relative to the plow is not materially varied when the plow is lifted into its transport position. The same is true of the hitch point 27, although as best shown in Figure 2, the hitch point 27 is swung upwardly into a fairly high position with respect to the tractor when the plow is elevated into its shallow plowing position. Since, as shown in Figure 2, in its shallow plowing position the arm 45 is not quite in a straight line relation with respect to the link 44, raising the plow into into its transport position will result in a certain amount of elevation of the hitch point and a certain amount of lowering of the gauge wheel 51. However, the latter is not moved to a point below the plow bottoms. In fact, lowering the gauge wheel to about the position shown has the advantage that the plow points are protected from striking obstructions since any obstructions encountered would first strike the gauge wheel and the latter would thus cause the plow to ride over such obstructions.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. For use in an agricultural implement comprising supporting means, a generally longitudinally extending tool beam, a generally vertically swingable hitch member connecting the front end of said beam with said supporting means for generally vertical movement relative to said supporting means and a ground engaging gauge movably carried by said tool beam, the improvements which comprise a bell crank adapted to be carried by the rear end of said hitch member and the forward end of said tool beam, means for connecting one arm of the bell crank with said gauge, means for connecting the other end of said bell crank with said supporting means, whereby raising or lowering of the rear end of said hitch means and the forward end of said tool beam causes said bell crank to swing and shift said ground engaging gauge, and means on said supporting means for raising and lowering said bell crank and the connected portion of said hitch means and tool beam.

2. The invention set forth in claim 1, further characterized by said ground engaging gauge including a generally upwardly extending portion and said bell crank including a generally upwardly extending portion, said portions lying in approximate parallelism, and said first mentioned collecting means being connected to said generally upwardly extending portions.

OREY W. OERMAN.

REFERENCES CITED

The following references are of record in the file of this patent:

UNITED STATES PATENTS

| Number | Name | Date |
|---|---|---|
| 1,830,013 | Bohmker | Nov. 3, 1931 |
| 1,893,619 | Geraldson | Jan. 10, 1933 |
| 1,941,013 | Lindgren et al. | Dec. 26, 1933 |
| 2,059,676 | Altgelt | Nov. 3, 1936 |
| 2,318,194 | Brown | May 4, 1943 |
| 2,324,868 | Mott | July 20, 1943 |
| 2,330,272 | Evans | Sept. 28, 1943 |
| 2,354,084 | Geraldson | July 18, 1944 |
| 2,357,847 | Ray | Sept. 12, 1944 |
| 2,357,916 | Strandlund | Sept. 12, 1944 |
| 2,368,156 | Orelind et al. | Jan. 30, 1945 |
| 2,368,631 | Blalock | Feb. 6, 1945 |
| 2,386,378 | Wippel | Oct. 9, 1945 |
| 2,436,155 | Silver | Feb. 17, 1948 |

FOREIGN PATENTS

| Number | Country | Date |
|---|---|---|
| 293,568 | Germany | Aug. 17, 1916 |
| 387,325 | Germany | Dec. 28, 1923 |
| 473,798 | France | Oct. 15, 1914 |
| 503,186 | France | Mar. 10, 1920 |